April 26, 1966 W. T. APPLEBERRY 3,247,753

QUICK RELEASE PINS

Filed Jan. 8, 1964 3 Sheets-Sheet 1

INVENTOR
WALTER T. APPLEBERRY
BY Leon D. Rosen
ATTORNEY.

QUICK RELEASE PINS
Filed Jan. 8, 1964 3 Sheets-Sheet 2
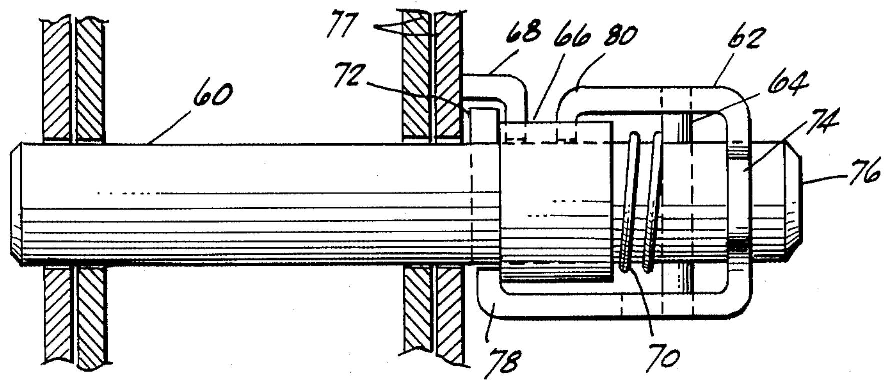
Fig. 5
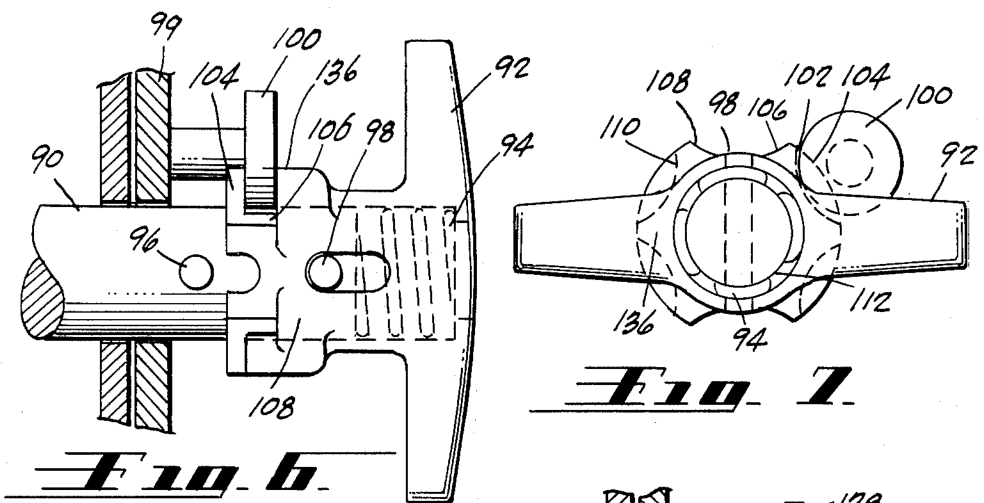
Fig. 6
Fig. 7
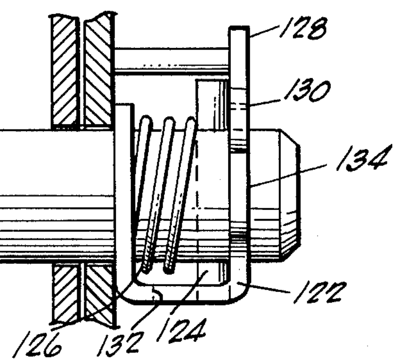
Fig. 8
INVENTOR
WALTER T. APPLEBERRY
BY Leon D. Rosen
ATTORNEY INVENTOR.
WALTER T. APPLEBERRY
BY Leon D. Rosen
ATTORNEY United States Patent Office — 3,247,753 — Patented Apr. 26, 1966

3,247,753
QUICK RELEASE PINS

Walter T. Appleberry, Long Beach, Calif., assignor to Douglas Aircraft Company, Inc., Santa Monica, Calif.

Filed Jan. 8, 1964, Ser. No. 336,593
8 Claims. (Cl. 85—5)

This invention relates to fastening devices and more particularly to pins adapted for insertion into and withdrawal from holes in objects.

Structures or parts are often temporarily held together by means of pins which extend through holes in the parts held. Many of such pins have utilized a locking device similar in operation to a cotter pin, which required the employment of several time-consuming and annoying operations in their use and which required that the end of the pin inserted through the workpieces be accessible. Other pins have employed spring projectable members such as balls which, however, did not positively lock the pin in place and which constituted a danger where accidental removal of the pin was hazardous. Other defects and shortcomings were inherent in each of the pins used heretofore. None provided a simple and economically produced pin which could be easily inserted and locked into place or easily unlocked and withdrawn, employing only one hand and using a simple and easily executed movement. The pins produced in accordance with this invention generally provide all of these advantages and others in addition.

Pins constructed in accordance with this invention generally include a shank having an insertion end adapted for insertion through holes in objects. A keeper is provided on an object through which the pin is inserted, and a protuberance is provided on a handle or outward end of the shank, the protuberance being adapted to fit behind the keeper to prevent withdrawal of the pin. In order to withdraw the pin, the shank must be rotated so that the protuberance clears the keeper. A handle or other member mounted on the shank is adapted to engage the keeper and prevent rotation of the shank unless the handle or other member is moved out of the way. The handle is spring biased in one longitudinal direction along the shank so that force must be employed to move the handle longitudinally before the part engaging the keeper to prevent rotation can be moved clear of the keeper, the shank can be rotated, and the protuberance can clear the keeper.

Accordingly, one object of the present invention is to provide a simple, reliable and easily manufactured pin of the type adapted for insertion through and withdrawal from apertures in objects.

Another object is to provide a pin of the described type which is operable with only one hand.

Still another object is to provide a simple and efficient pin of the described type which is positively locked in place.

These and other objects and a more complete understanding of the invention may be had by reference to the accompanying description and claims taken in conjunction with the accompanying drawings in which:

FIG. 5 is a side elevation view of a third embodiment of the invention adapted for insertion by pushing either a handle or shank;

FIG. 6 is a side elevation view of a fourth embodiment of the invention adapted for withdrawal by pushing on the handle;

FIG. 7 is an end elevation view of the embodiment of FIG. 6;

FIG. 8 is a fifth embodiment of the present invention, which provides a quick release pin of extremely simple construction.

Figure 1:
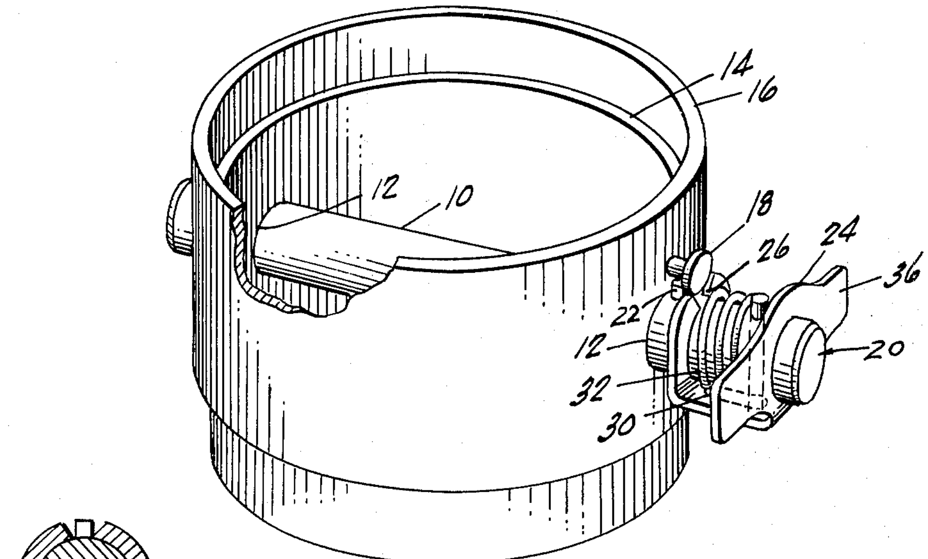
FIGURE 1 is a pictorial illustration of one embodiment of the invention shown locked in position in two parts which it is holding together.
Figure 2:
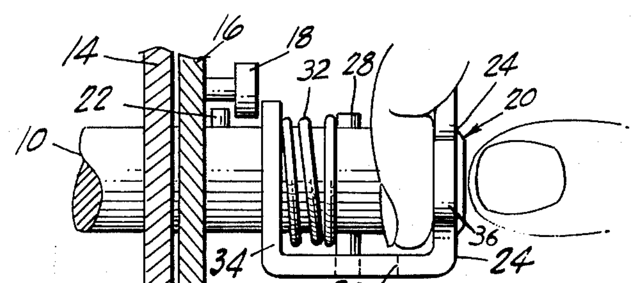
FIG. 2 is a side elevation view of the first embodiment, shown being withdrawn.

With reference to the drawings wherein like numerals refer to like references, and in particular to FIGS. 1 and 2 which illustrate a first embodiment of the invention, the invention generally comprises a shank 10 adapted for insertion through holes 12 formed in objects 14 and 16 adapted to be held together by the quick release pin of the invention. One of the parts 16 through which the quick release pin is inserted includes a keeper 18 fixed to the outside of the object near the hole 12. An outer end portion 20 of the shank 10 includes a roll pin 22 which projects radially outward of the shank. The roll pin 22 is adapted to fit behind the keeper 18 to prevent withdrawal of the shank 10 from the holes 12, thus assuring that the objects 14 and 16 are securely fastened together.

In order to insert or withdraw the shank from the holes 12 the shank must be rotated so that the roll pin 22 is clear of the keeper 18. A handle 24 is positioned over the outer end portion 20 of the shank. The handle 24 includes a keeper groove 26 adapted to fit partially around the keeper 18 and prevent rotation of the shank and disengagement of the roll pin 22 from the keeper 18. A holding pin 28 which projects through the outer end portion 20 of the shank and into a groove 30 formed in the handle, prevents relative rotation of the shank 10 and handle 24. Thus when the keeper groove 26 of the handle engages the keeper 18, neither the handle 24 nor the shank 10 can be rotated, and the roll pin 22 remains behind the keeper 18 to hold the quick release pin in place.

A helical spring 32 is provided which fits over the outer end portion 20 of the shank and which is disposed between an inward portion 34 of the handle and the holding pin 28. The spring 32 is of sufficiently small diameter and the holding pin 28 projects sufficiently out of radially opposite sides of the shank that the spring 32 is securely held in place. The spring 32 biases the handle 24 inwardly toward the keeper 18 so that the keeper groove 26 of the handle tends to remain engaged with the keeper 18. In order to disengage the keeper groove 26 from the keeper 18 the handle 24 must be pulled in an outward direction so that the inward portion 34 of the handle moves away from the objects held by the quick release pin and toward the holding pin 28. This movement must be made against the compressive force of the helical spring 32. Tabs 36 are provided on the handle to enable the easy grasping of it so that it may be pulled and rotated against the spring pressure.

The quick release pin may be released in a manner shown in FIG. 2 by pulling on the handle 24; release is often easier if the outward end 20 of the shank is pressed while the handle is pulled. The handle is pulled outwardly sufficiently that the inward portion 34 of the handle and the keeper groove 26 contained therein are clear of the keeper 18. The handle and attached shank are rotated a sufficient amount, such as 30° so that the roll pin 22 is clear of the overhanging portions of the keeper 18 and the pin can be pulled out of the holes 12. The groove 30 engaged by the retaining pin 28 is of sufficient length that the handle can be pulled back the required distance. In order to insert the quick release pin, the handle 24 may be pulled backward, the pin being inserted sufficiently far that the roll pin 22 touches the outer walls of the part 16. The handle 24 is then rotated so that the roll pin 22 is rotated to a position behind the keeper 18. The handle 24 is then released so that the keeper groove 26 engages the keeper 18 and neither the handle nor the shank can be rotated. Another way in which the quick release pin may be inserted is by positioning the handle 24 so that the roll pin 22 is clear of the keeper 18 and can be pushed past it, and then pushing on the outer end portion 20 of the shank without pulling on the handle 24. The force of the keeper 18 on the inward portion 34 of the handle will compress the spring 32 and push the handle backward or outwardly as though it were being pulled. Once the handle is pushed back far enough that the roll pin 22 is behind the overhanging portions of the keeper 18, the handle 24 will tend to rotate itself into position wherein the keeper groove 26 is engaging the keeper 18. If the handle 24 does not tend to snap into position it can be easily turned. In either case, somewhat less effort is required than is the case wherein the handle 24 must actually be pulled backward.

It can be seen that the shape of the keeper 18 is essentially that of a bolt, while the shape of the keeper groove 26 is of an indentation which generally closely follows the contour of the head of the bolt. The keeper can be of almost any shape which has an overhanging portion for retaining a roll pin or similar device. The keeper groove 26 can also be of any one of a number of shapes including a flat horizontal ledge immediately below the keeper which does not enclose the keeper at all. Even a horizontal surface will prevent excessive rotation of the handle and keep the roll pin 22 behind the keeper, though it is then likely that the quick release pin will appear to fit loosely.

Figure 4:
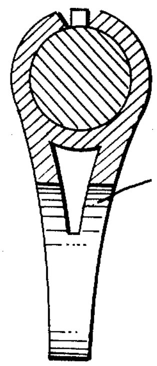
FIG. 4 is a sectional view taken on the line 4—4 of FIG. 3.
Figure 3:
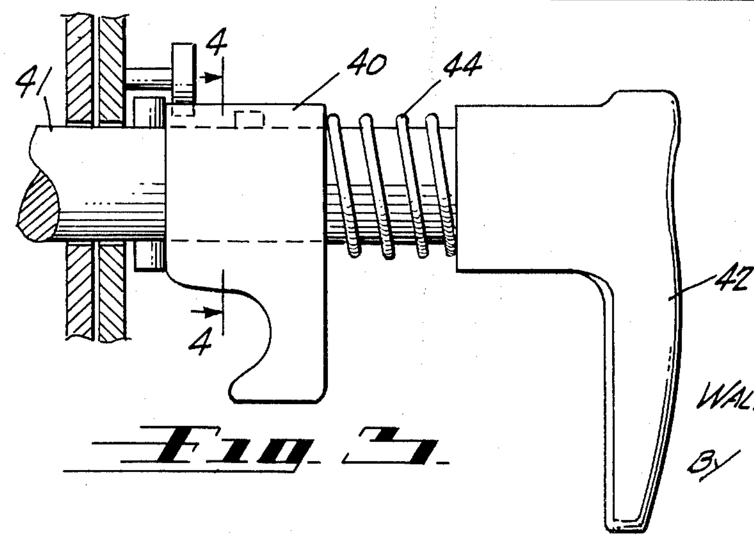
FIG. 3 is a side elevation view of a second embodiment of the invention generally operated by pulling a trigger-like handle.

A second embodiment of the invention which is operated like a gun, by pulling a trigger is illustrated in FIGS. 3 and 4. This embodiment is very similar to the embodiment of FIGS. 1 and 2 except that it includes a handle 40 having the shape of a trigger, and a grip 42 mounted on the end portion of a shank 41. A spring 44 is retained between the handle 40 and grip 42. The primary advantage of this embodiment of the invention is that it is easy to hold and operate.

A third embodiment of the invention is designed for facile insertion. This embodiment, illustrated in FIG. 5, includes a shank 60, a handle 62 disposed over the outward end of the shank, a holding pin 64 for preventing relative rotation of the handle and shank, a keeper engager 66 for engaging a keeper 68 to prevent rotation of the quick release pin, and a spring 70 for holding the keeper engager 66 in engagement with the keeper 68. A roll pin 72 is provided which is positioned behind the keeper 68 when the quick release pin is inserted to prevent its withdrawal.

The keeper engager 66 can move outwardly independent of the shank 60 or the handle 62. Thus, when the quick release pin is first inserted while being rotated so that the roll pin 72 can clear the keeper 68, the pin may be finally inserted by pushing on the tabs 74 of the handle 62 or by pushing on the end 76 of the shank, or by pushing on both of them. Pushing force on the handle 62 is directly transmitted through the holding pin 64 to the shank 60, and the shank moves forward to position the roll pin 72 behind the keeper 68. The keeper 68 pushes against the keeper engager 66 which may freely move outwardly toward the shank end 76 since there is nothing to stop its outward movement. Once the roll pin 72 is positioned against the parts 77 to be held together, and thus is located behind or inwardly of the keeper 68, a slight twist of the handle 62 causes the engaging groove of the keeper 66 to engage the keeper 68. The keeper engager 66 then flies forward, being pushed by the compressed spring 70.

Release of the quick release pin may be accomplished in much the same way as release of the pin of FIGS. 1 and 2. The tabs 74 of the handle are grasped and pulled backward or outwardly; for easier operation the end 76 of the shank is pushed forward or inwardly while the tabs are pulled. A first hook portion 78 of the handle 62 is disposed over the keeper engager 66 so that when the handle is pulled back the first hook portion pulls the keeper engager 66 back until it clears the keeper 68. Another, second hook portion 80 of the handle 62 is provided to engage a groove of the keeper engager 66 to prevent relative rotation of the keeper engager 66 and the handle 62.

Although the third embodiment illustrated in FIG. 5 is slightly more complex than the first embodiment illustrated in FIGS. 1 and 2, the third embodiment has the advantage of allowing insertion and removal to be more easily made, by the application of pressure on either the end 76 of the shank or the handle 72 or any parts of it such as the handle tabs 74. The keeper 68 serves the same function as the keeper 18 of FIGS. 1 and 2 but is shown in a slightly different form merely to illustrate another possible shape.

A fourth embodiment of the invention is shown in FIGS. 6 and 7 which illustrate an embodiment in which a handle must be pushed inwardly in order to insert or retract the quick release pin. This embodiment comprises a shank 90 for insertion through holes in objects or structures to be held together, a handle 92 slidably mounted on an outer end portion of the shank, and a spring 94 disposed between the outer end of the shank 94 and the handle 92. A roll pin 96 is provided to limit the depth of insertion of the shank into the objects to be held, and a retainer pin 98 which extends radially through the outer end portion of the shank 90 and protrudes therefrom, is provided to prevent relative rotation of the handle 92 and shank 90.

The outer of the objects 99 to be held together includes a keeper 100 for engagement with the handle 92 of the quick release pin. The keeper 100 is held in a hollowed portion 102 of the handle 92 and abuts a raised rim 104 of the handle to prevent withdrawal of the pin. In order to withdraw the pin from the objects held together by it, the handle must be pushed inwardly until the overhanging portion of the keeper 100 clears a lip 106 of the handle so that the handle 92 can be rotated to a position wherein the keeper 100 is aligned with a cutaway portion 108 of the handle. The handle can then be pulled outwardly or withdrawn because the keeper 100 then clears any projection on the handle. The amount of projection of the roll pin 96 from the surface of the shank is small enough to prevent interference with the keeper 100.

The insertion of the fourth embodiment of the quick release pin into position is accomplished in a manner somewhat similar to its withdrawal. The shank 90 is inserted through the objects to be held together, the handle 92 being turned so that the cutaway portion 108 is aligned with the keeper 100. The quick release pin can be inserted far enough so that the roll pin 96 abuts the outer surface of the objects to be held by the quick release pin. The keeper 100 is then resting in the cutaway portion 108 of the handle 92. The handle 92 is then pushed inwardly against the force of the spring 94 so that the keeper 100 can clear the lip 106. While the handle is so pushed it is rotated so that the keeper 100 is aligned with the hollowed portion 102. Rotation is limited to the proper amount by a protuberance 136 on the handle. Pressure on the handle 92 is then released and the overhanging portion of the keeper 100 then rests within the hollowed portion 102, so the quick release pin is held securely in place. The handle 92 is symmetrical around the cut away portion 108 so that the quick release pin may be rotated in either direction and the keeper will be held in either the indentation 102 or an identical indentation 110 provided on the other side of the cutaway portion 108.

The fourth embodiment of the pin is very easy to operate inasmuch as pushing forces are easily applied to handles. As can be seen in the figures, the spring 94 is enclosed by the handle so that the pin has a simple appearance and few of the working parts are exposed. The pin is easily assembled by placing the coil spring 94 over the end of the shank 90 and slipping the handle 92 over them. While the spring is slightly compressed the retainer pin 98 is then inserted to hold the handle in place. The roll pin 96 may be inserted at any time. The spring 94 is very simply held by the end of the shank 90 and several wings 112 positioned at the end of the handle 92.

A fifth embodiment of the invention, shown in FIG. 8, is a highly simplified version of the quick release pin, which employs a minimum of parts. This embodiment includes a shank 120, a handle 122 disposed over the shank, a retainer pin 124 inserted through the shank, and a spring 126 disposed about the shank and having one end resting in a groove 135 formed in the retainer pin. A long keeper 128 attached to the outer surface of the objects or structures to be held is provided, which fits in an indentation 130 of the handle. The retainer pin 124 protrudes sufficiently from the shank 120 that it interferes with the keeper 128 and prevents withdrawal of the quick release pin. The retainer pin 124 also includes one end which protrudes from the shank and engages a slot 132 in the handle 122 to prevent relative rotation of the shank and handle.

In order to withdraw the quick release pin, tabs 134 on the handle must be pulled while the outward end of the shank 120 is pushed in a manner similar to that shown in FIG. 2 for the first embodiment of the invention, so that the keeper 128 is clear of the handle 122. The handle is then rotated so that the keeper 128 will be clear of the retainer pin 124, and the quick release pin may then be withdrawn. Insertion of the quick release pin is accomplished by pushing on the outward end of the shank 120 while either pulling on the tabs 134 of the handle or allowing the keeper 128 to push the handle and overcome the force of the spring 126. Once the keeper 128 is in front or outward of the retainer pin 124, the handle is rotated or allowed to rotate so that the pin 124 is behind the keeper and the keeper is in the groove 130 of the handle. As with other embodiments of the invention, no groove 130 is required, although a groove prevents more than a minimum of rotation of the pin when it is in place, and thus greater manufacturing tolerances can be allowed while still assuring that the keeper cannot be accidentally rotated to clear the retaining pin 124. The major disadvantage of the fifth embodiment of the invention is that the keeper 128 is relatively long. A shorter keeper 128 could be used if the roll pin 124 had keeper engaging portions which curved and extended inwardly. This would tend to increase the complexity of the parts, but the advantage of a shorter keeper is important in many applications.

Figure 9:
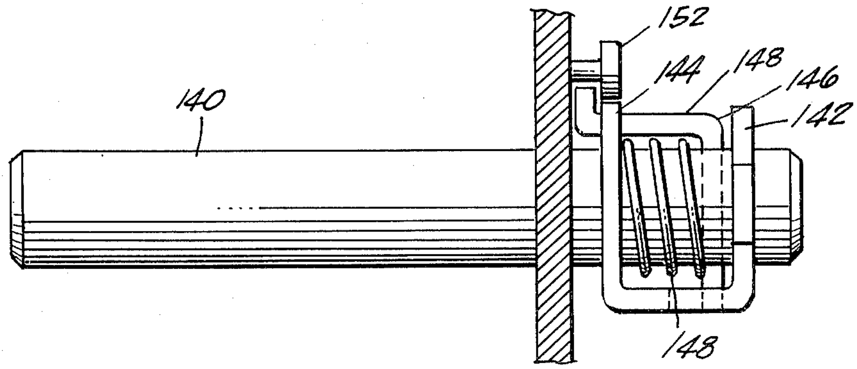
FIG. 9 is a variation of the fifth embodiment, which allows the use of a short keeper.

A variation in the fifth embodiment, to allow the use of a short keeper, is illustrated in FIG. 9. The pin includes a shank 140, a U-shaped handle 142 including keeper engaging portions on the inward leg 144, a roll pin 146 which includes an inwardly extending curved portion 148, and a helical spring 150. As can be seen from FIG. 9, only a short keeper 152 is required.

While certain advantageous embodiments of the invention have been chosen for illustration, it will be understood by those skilled in the art that various changes and modifications therein can be made without departing from the scope of the invention as defined in the appended claims.

I claim:

1. A quick release pin for engagement with a keeper on objects or structures to be held comprising:

a shank for insertion in openings in said structures to be held;

a U-shaped handle defining two legs, said handle being mounted on said shank, said shank extending through apertures in each of said legs;

keeper rotation prevention means for preventing relative rotation of said handle and said keeper, said keeper rotation prevention means being operably associated with said handle for disposal adjacent said keeper;

handle rotation prevention means for preventing relative rotation of said shank and handle and being disposed between said shank and said handle;

keeper catching means including a portion spaced from the surface of said shank adapted for catching said keeper and preventing withdrawal of said quick release pin;

coil spring means operable between said shank and handle for biasing said handle in one longitudinal direction along said shank wherein said keeper rotation prevention means is disposed adjacent to said keeper, said spring means being disposed about said shank and between the legs of said handle; and said shank including a retaining means mounted between the legs of said handle for holding one end portion of said coil spring and preventing relative rotation between said handle and shank.

2. A quick release pin for engagement with a keeper on objects or structures to be held comprising:

a shank for insertion in openings in said structures to be held;

a handle slidably mounted on said shank;

keeper rotation prevention means for preventing relative rotation of said handle and said keeper, said keeper rotation prevention means being operably associated with said handle for disposal adjacent said keeper;

handle rotation prevention means for preventing relative rotation of said shank and handle and being disposed between said shank and said handle;

keeper catching means including a portion spaced from the surface of said shank adapted for catching said keeper and preventing withdrawal of said quick release pin;

spring means operable between said shank and handle for biasing said handle in one longitudinal direction along said shank wherein said keeper rotation prevention means is disposed adjacent to said keeper;

a grip mounted on said shank, wherein said spring means is a coil spring disposed around said shank and having end portions abutting said handle and said grip;

said keeper rotation prevention means comprises a longitudinally extending keeper slot formed in said handle; and said rotation prevention means comprises a member mounted on said shank and protruding into said keeper slot.

3. A quick release pin for engagement with a keeper on objects or structures to be held comprising:

a shank for insertion in openings in said structures to be held;

a handle slidably mounted on said shank;

keeper rotation prevention means for preventing relative rotation of said handle and said keeper, said keeper rotation prevention means being operably associated with said handle for disposal adjacent said keeper;

handle rotation prevention means for preventing relative rotation of said shank and handle and being disposed between said shank and said handle;

keeper catching means including a portion spaced from the surface of said shank adapted for catching said keeper and preventing withdrawal of said quick release pin;

spring means operable between said shank and handle for biasing said handle in one longitudinal direction along said shank wherein said keeper rotation prevention means is disposed adjacent to said keeper;

said keeper rotation prevention means includes a collar means slidably mounted along said shank independently of said handle; and a hooking means on said handle for engaging and preventing inward movement of said collar means.

4. A quick release pin as defined in claim 2 including:

a longitudinal slot in said collar means; and a hook portion on said handle engaged in said slot to prevent relative rotation of said handle and said collar means.

5. A quick release pin for engagement with a keeper on objects or structures to be held comprising:

a shank for insertion in openings in said structures to be held;

a handle slidably mounted on said shank;

keeper rotation prevention means for preventing relative rotation of said handle and said keeper, said keeper rotation prevention means being operably associated with said handle for disposal adjacent said keeper;

handle rotation prevention means for preventing relative rotation of said shank and handle and being disposed between said shank and said handle;

keeper catching means including a portion spaced from the surface of said shank adapted for catching said keeper and preventing withdrawal of said quick release pin;

spring means operable between said shank and handle for biasing said handle in one longitudinal direction along said shank wherein said keeper rotation prevention means is disposed adjacent to said keeper;

said keeper catching means comprises a catching lip on said handle;

said keeper rotation prevention means comprising a rotation prevention lip on said handle adjacent to and longitudinally spaced from said catching lip;

said handle including a cutaway portion for enabling said catching and rotation prevention lips to be moved longitudinally from said keeper;

said handle including a spring enclosure portion extending outwardly or past the outward end of said shank; and said spring means includes a helical spring disposed within said spring enclosure portion and having one end portion abutting the outward end of said shank and an opposite end portion abutting said handle.

6. A quick release pin for engagement with a keeper on objects or structures to be held comprising:

a shank for insertion in openings in said structures to be held;

a handle slidably mounted on said shank;

keeper rotation prevention means for preventing relative rotation of said handle and said keeper, said keeper rotation prevention means being operably associated with said handle for disposal adjacent said keeper;

handle rotation prevention means for preventing relative rotation of said shank and handle and being disposed between said shank and said handle;

keeper catching means including a portion spaced from the surface of said shank adapted for catching said keeper and preventing withdrawal of said quick release pin;

spring means operable between said shank and handle for biasing said handle in one longitudinal direction along said shank wherein said keeper rotation prevention means is disposed adajacent to said keeper;

said handle being U-shaped defining an inward and an outward leg, said shank extending through apertures in each of said legs;

said keeper rotation prevention means comprises a surface on one of said legs;

said handle having a longitudinally extending slot;

said handle rotation prevention means and said keeper catching means comprise a member extending through said shank and having one end portion extending into said longitudinally extending slot in said handle and an opposite end portion adapted to engage said keeper and prevent withdrawal of said pin; and said spring means comprises a helical spring disposed around said shank and having an end portion abutting said inward handle leg and an opposite spring end portion abutting said member of said handle rotation prevention means.

7. A quick release pin as deflined in claim 6 wherein:

said member extending through said shank is essentially straight; and said keeper rotation prevention means comprises a surface on the end portion of said outward handle leg.

8. A quick release pin as defined in claim 6 wherein:

said member extending through said shank includes an inwardly extending keeper catcher portion which extends inwardly of said inward leg of said handle; and said keeper rotation prevention means comprises a surface on the end portion of said inward handle leg.

References Cited by the Examiner

UNITED STATES PATENTS

| | | | |
|---|---|---|---|
| 630,169 | 8/1899 | Black. | |
| 822,494 | 6/1906 | Urmston | 85—7 |
| 1,396,205 | 11/1921 | Hill et al. | 292—60 |
| 1,419,974 | 6/1922 | McLaughlin | 85—7 |
| 2,140,132 | 12/1938 | Hollett | 280—515 |

FOREIGN PATENTS

| | | |
|---|---|---|
| 161,794 | 12/1957 | Sweden. |

CARL W. TOMLIN, *Primary Examiner.*

M. PARSON, Jr., *Assistant Examiner.*